:::
United States Patent [19]

Yamamoto et al.

[11] Patent Number: 4,548,480
[45] Date of Patent: Oct. 22, 1985

[54] PROJECTION LENS APPARATUS

[75] Inventors: Yoshiharu Yamamoto, Toyonaka; Yasuo Nakajima, Ibaraki; Yoshitomi Nagaoka, Neyagawa, all of Japan

[73] Assignee: Matsushita Electric Industrial Co., Ltd., Kadoma, Japan

[21] Appl. No.: 459,242

[22] Filed: Jan. 19, 1983

[30] Foreign Application Priority Data

Jan. 20, 1982 [JP] Japan .................................. 57-8113

[51] Int. Cl.$^4$ .......................... G02B 3/04; G02B 9/12
[52] U.S. Cl. ................................. 350/432; 350/477
[58] Field of Search ............................. 350/432, 477

[56] References Cited

U.S. PATENT DOCUMENTS 4,300,817  11/1981  Betensky ............................. 350/477
4,348,081  9/1982  Betensky ............................. 350/477

FOREIGN PATENT DOCUMENTS 0108818  7/1982  Japan ................................. 350/432

*Primary Examiner*—John K. Corbin
*Assistant Examiner*—Rebecca D. Gass
*Attorney, Agent, or Firm*—Wenderoth, Lind & Ponack

[57] ABSTRACT

A projection lens apparatus for projecting an image from a CRT onto a remote screen. The lens apparatus is basically a Petzval type for a large aperture ratio and comprises three lenses. The first lens is a plastic lens having at least one aspherical surface and the third lens has a bi-aspherical surface. To reduce the thermal drift of the focal position, the second lens is a glass lens, having relatively largely positive optical power.

9 Claims, 8 Drawing Figures

PROJECTION LENS APPARATUS

BACKGROUND OF THE INVENTION

1. Field of the Invention

This invention relates to a projection lens apparatus suitable for use in a projective display apparatus for enlarging and projecting pictures of a television receiver.

Such projection lens apparatus for the projective display apparatus should have a larger aperture ratio and a larger angle of view, the larger aperture ratio being necessary to obtain a bright picture by efficiently focusing the luminous flux generated from the cathode-ray tube, the larger angle of view being for achieving a larger projection magnification in a smaller projection distance so as to miniaturize the apparatus.

2. Description of the Prior Art

Conventionally, the kind of lens has employed a glass lens, which has remarkably increased the weight as well as increased the aperture following enlargement of aperture ratio, resulting in the problem created in the construction of the display apparatus and the manufacturing cost. On the contrary, it is possible to reduce the number of lenses while still achieving the effect of the aspherical surface thereof to thereby reduce the weight of the apparatus, but the glass lens leads to an extremely high manufacturing cost because its manufacturing technique is difficult if it is to sufficiently meet the aforesaid requirement.

Recently, projection lenses of plastic material, with the above technical characteristics, have come out. The three-tube system projective display apparatus, which uses monochromatic cathode-ray tubes of green, blue and red, mostly does not require correction of the chromatic aberration because of the relatively narrow width of the emission spectrum of each cathode-ray tube, so that the characteristics of the plastic lens, such as light weight and easy production of the aspherical surface, may make the lens usuable in as a projection lens for the projective display apparatus.

Such projection lens apparatus has been well-known as described in the Japanese Patent Laid-Open No. Sho 55-124114, which has a simple construction using the plastic lens with aspherical surface to achieve the larger aperture ratio as well as using three lenses. Hence, the apparatus is quite advantageous as to the manufacturing cost, but has several problems as follows:

Firstly, the overall lens elements are of plastic so that they have a temperature characteristic which causes a problem, namely, since plastic has a value of the temperature dependency of refractive index which is larger by about two units than that of glass, a drift of the focal position due to the temperature change in the ambient atmosphere, which not been a problem at all with glass lenses, becomes substantial so that when the temperature at the location of its projective display apparatus fluctuates substantially, for example in summer and winter, the focus occasionally shifts so that the apparatus is of no practical use.

Secondly, the second lens has a larger center thickness which will generate a larger thermal gradient at the center and periphery of lens in the heat cycle during the molding of the plastic lens, which may make it difficult to maintain the uniformity of lens.

Thirdly, the overall length of the lenses is larger by about 1.8f from the vertex of the first lens to that of the third lens, which leads to difficulty in enlarging the angle of view and making the apparatus compact.

SUMMARY OF THE INVENTION

In the light of the above problems, the present invention has been made. An object of the invention is to provide a projection lens apparatus which can obtain a larger aperture ratio while the angle of view is larger, and improve the temperature characteristic in the environmental atmosphere, thereby eliminating the above defects.

The projection lens system for the projection lens apparatus of the invention is constituted basically of the Petzval type lens system for a larger aperture ratio and has a third lens added which is a negative lens for compensating for the curvature of field, in turn the Petzval image plane, and the lens system comprises a first double-convex positive lens having one convex surface with a larger curvature facing toward the screen, a second lens which is a double-convex positive lens having one convex surface with a larger curvature facing toward the screen and disposed behind the first lens, and a third lens which is a negative lens having one concave surface with a larger curvature facing toward the screen, these lenses being arranged in the order from the screen side, the first lens being a plastic lens, the second lens being a glass one, the third lens being a plastic one, and further having a glass face plate at the cathode-ray tube end toward the cathode ray tube emitting pictures to be enlarged and projected by the projection lens system, the glass face plate having plano-convex-lens-like-shape with the surface of larger curvature being the fluorescent side.

BRIEF DESCRIPTION OF THE DRAWINGS

The above and other objects and features of the present invention will become more apparent from the following description taken with the accompanying drawings in which.

DESCRIPTION OF THE PREFERRED EMBODIMENTS

Figure 1:
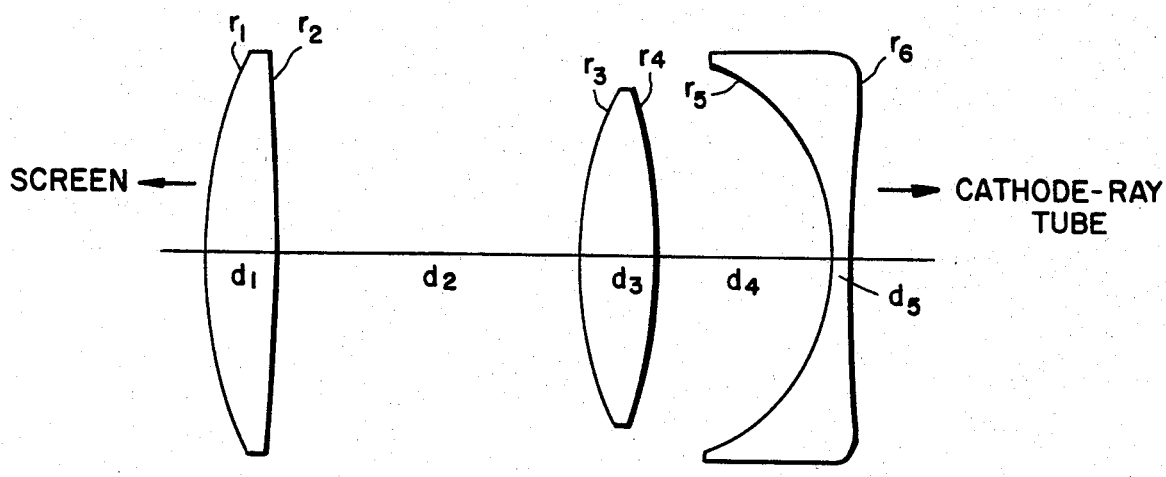
FIG. 1 is a schematic structural view of an embodiment of a projection lens apparatus of the invention.

Next, embodiments of the projection lens apparatus of the invention will be described in accordance with the accompanying drawings.

The projection lens system for the projection lens apparatus of the invention allots the positive power to the first and second lenses, especially relatively largely to the latter, and makes the second has a glass lens and the first and third lenses plastic ones, thereby remarkably restricting fluctuation of focal length caused by the temperature change in the overall lens system. In other words, the first and third lenses are plastic lenses having a larger fluctuation of optical performance due to the temperature change and have the positive and negative power respectively, thereby cancelling the above fluctuation. Furthermore, the first lens takes over a considerable portion of the positive power to thereby enable reduction of the outer diameter of the second lens, thus restricting as much as possible any increase in weight or the manufacturing cost. In addition, the influence of the above construction on the spherical aberration is corrected by making at least one surface of the first lens aspherical and is also restricted by making the absolute value of the radius of curvature at the front surface of the second lens smaller than that of the rear surface thereof, thereby achieving the larger aperture ratio.

Also, for the oblique luminous flux out of the axis, the radius of curvature of the front surface of the first group lens is made smaller in absolute value than that of the rear surface and similarly the radius of curvature of the front surface of the second lens is smaller than the rear surface, thereby reducing creation of coma and further correcting it by making the third lens bi-aspherical.

Furthermore, the third lens serves to provide the negative power to thereby correct the Petzval image plane, so that the closer the lens is positioned to the cathode-ray tube, the smaller the Petzval sum becomes. On the contrary, since the first and second lenses have the positive powers, the third lens, when closer to the first and second lenses, in other words, far apart from the cathode-ray tube, is effective for correction of the oblique luminous flux out of the axis and for enlargement of the angle of view. Hence, the projection lens system of the projection lens apparatus of the invention reduces the distance between the second and third lenses, thereby achieving a larger angle of view.

Now, the projection lens system of the projection lens apparatus of the invention employs a lens system satisfying the following conditions, thereby further improving the characteristics of the lens system:

(1) $0.4|r_4| < r_3 < 0.75|r_4|$
(2) $0.5 < f/f_1 < 0.8$
(3) $0.8 < f/f_2 < 1.0$
(4) $-1.2 < f/f_3 < -0.9$
(5) $1.3 < f_1/f_2 < 1.8$
(6) $0.35f < d_4 < 0.55f$, and
(7) $4r_1|r_2|$ where f: focal length of projection lens system,
  $f_1$: the focal length of the first lens,
  $f_2$: the focal length of the second lens,
  $f_3$: the focal length of the third lens,
  $d_4$: the distance between the second and third lenses,
  $r_1$: the radius of curvature of the surface on the screen side, i.e., the front surface, of the first lens,
  $r_2$: the radius of curvature of the rear surface of the first lens,
  $r_3$: the radius of curvature of the front surface of the second lens, and
  $r_4$: the radius of curvature of the rear surface of the second lens.

The condition (1) relates to a ratio between the radii of curvature of front surface and rear surface of the second lens. When the ratio is close to or over the lower limit, an amount of spherical aberration created at the second lens decreases which is advantageous to enlargement of the aperture ratio, but in the case of exceeding the lower limit, the aberration of oblique luminous flux out of the axis becomes difficult to correct. On the other hand, when the ratio is close to or over the upper limit, the back focus is easy to elongate, but the spherical aberration from the second lens increases so that, in the case of exceeding the upper limit, the aperture ratio becomes difficult to enlarge and also the aberration of oblique luminous flux out of the axis becomes difficult to correct, thus making difficult the enlargement of angle of view.

The condition (2) relates to the power of the first lens, which, when over the lower limit, allows the power of second lens to be intensive and increases the central thickness thereof, thereby creating the problem of the weight and manufacturing cost. When the power exceeds the upper limit, an incident angle of oblique luminous flux out of the axis of the second lens is increased which makes difficult the correction of aberration out of the axis.

The condition (3) relates to the power of second lens. When the power exceeds the lower limit, the first lens bears a larger part of power causing the problem of the influence on the spherical aberration. When the power exceeds the upper limit, the central thickness of the second lens is made larger which causes the problem in the weight and manufacturing cost.

The condition (4) relates to the power of the third lens. When the power exceeds the lower limit, the peripheral thickness of the convex lens becomes very much larger to increase its ratio to the central thickness to thereby generate a large temperature during the molding process so as to make it difficult to maintain the uniformity. On the other hand, when over the upper limit, the Petzval sum does not decrease enough.

The condition (5) relates to the allotment ratio between the first and second lenses. The power of the first lens, when the ratio exceeds the lower limit, increases so as to affect the spherical aberration. Besides this, the change in the power of the first lens largely affects the overall system, whereby the glass lens constituting the second lens, which is introduced to restrict the fluctuation in focal length due to the temperature change in the first and third plastic lenses is not so effective. On the other hand, when over the upper limit, the power of the second lens becomes intensive which increases the central thickness of this lens, thus causing the problem in the weight and manufacturing cost.

The condition (6) relates to the distance between the second lens and the third lens. When the distance exceeds the lower limit, the effect of reducing the Petzval sum decreases. When it exceeds the upper limit, the Petzval sum decreases advantageously, but the correction of aberration in the oblique luminous flux out of the axis becomes difficult.

The condition (7) relates to the ratio between the radii of curvature at the front and rear surfaces of the first lens. In a case where this condition is not satisfied, it is difficult to balance the spherical aberration with correction of aberration of oblique luminous flux out of the axis.

The projection lens system in the projection lens apparatus of the invention makes at least one surface of the first lens aspherical to thereby correct the spherical aberration, which is necessary for the spatial frequency characteristic the required on axis and the power allotment of the first lens. The third lens, which is made aspherical on both surfaces, need only be aspherical at either surface to correct the aberration out of the axis, i.e., coma aberration, but both the aspherical surfaces are required to balance the astigmatism with the amount of spherical aberration.

Figure 3:
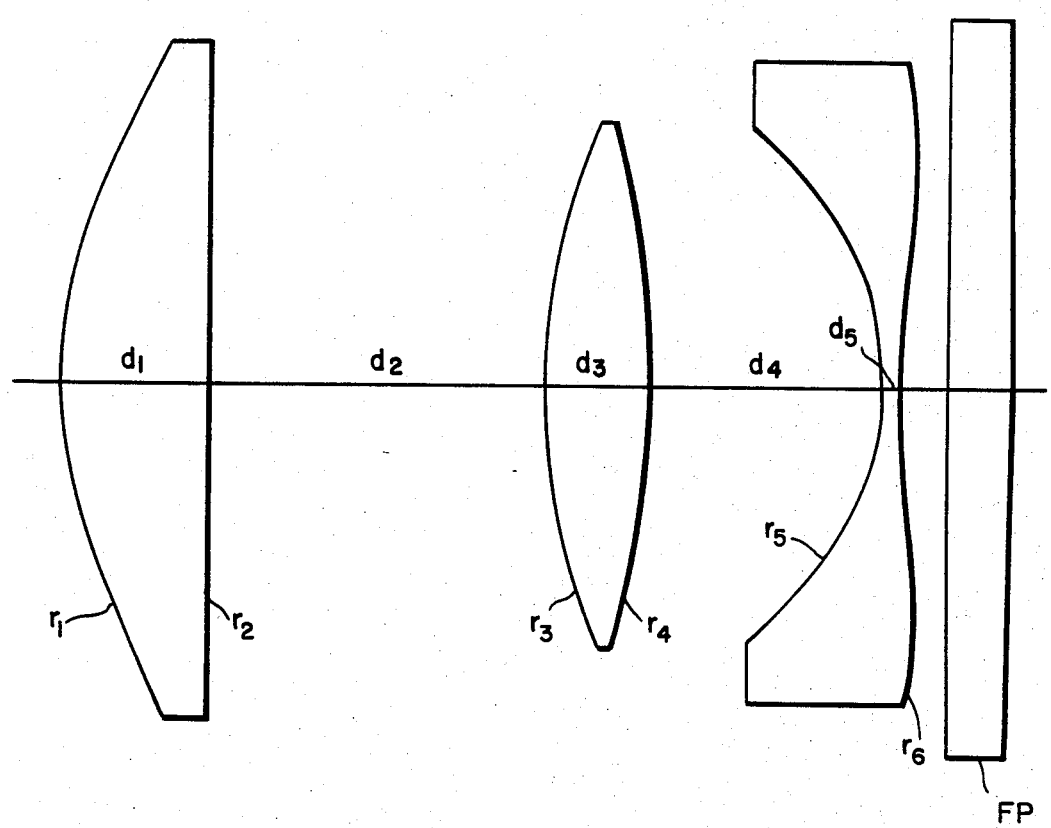
FIG. 3 is a schematic structural view of another embodiment of a projection lens apparatus of the present invention.

Next, concrete embodiments of the invention will be shown. In the following embodiments, the lens structures of Embodiments 1–5 are as shown in FIG. 1 and the lens structure of Embodiment 6 is as shown in FIG. 3.

(Embodiment 1)

|  | R | D | N | ν |
|---|---|---|---|---|
| L$_1$ | 147.505*1 | 22.83 | 1.491 | 57.2 |
|  | −768.890 | 103.40 |  |  |
| L$_2$ | 149.949 | 23.06 | 1.589 | 61.0 |
|  | −224.496 | 60.42 |  |  |
| L$_3$ | −68.655*2 | 6.90 | 1.491 | 57.2 |
|  | −3379.868*3 |  |  |  | f=140.02 mm; 1:1.01 (when an object point is infinite ∞)

Overall length of L$_1$ through L$_3$: 1.55f, and a half angle of view w=23.3°, where R is a radius of curvature, D a distance between the surfaces, N an index of refraction, and ν Abbe number.

The symbol * represents the aspherical surface, and, when an amount of deviation from the vertex of the lens and at the position spaced from the optical axis of lens by the semi-aperture distance Y is represented by X, is given by the following equation:

$$X = \frac{\frac{Y^2}{R}}{1 + \sqrt{1 - (1+K)\left(\frac{Y}{R}\right)^2}} +$$

$$AD \cdot Y^4 + AE \cdot Y^6 + AF \cdot Y^8 + AG \cdot Y^{10},$$

where AD, AE, AF and AG designate the aspherical coefficient and K, the conic constant. The aspherical coefficients and conic constant are as follows:

|  | *1 | *2 | *3 |
|---|---|---|---|
| AD: | −1.1823 × 10$^{-7}$ | −1.6693 × 10$^{-11}$ | 1.8603 × 10$^{-6}$ |
| AE: | 9.1990 × 10$^{-12}$ | 2.8769 × 10$^{-14}$ | −1.0821 × 10$^{-9}$ |
| AF: | −3.3846 × 10$^{-15}$ | 4.6312 × 10$^{-18}$ | 2.6821 × 10$^{-13}$ |
| AG: | 2.6734 × 10$^{-19}$ | 4.0000 × 10$^{-18}$ | −2.6000 × 10$^{-17}$ |
| K: | 1.5934 × 10$^{-1}$ | −6.3300 × 10$^{-5}$ | 2.4520 × 10$^3$ |

(Embodiment 2)

|  | R | D | N | ν |
|---|---|---|---|---|
| L$_1$ | 97.656*1 | 19.39 | 1.491 | 57.2 |
|  | −4804.913*2 | 86.02 |  |  |
| L$_2$ | 115.067 | 14.39 | 1.589 | 61.0 |
|  | −273.293 | 49.15 |  |  |
| L$_3$ | −55.849*3 | 4.00 | 1.491 | 57.2 |
|  | 507.712*4 |  |  |  | f=116.89 mm 1:1.07 (when an object point is infinite ∞)

Overall length of L$_1$ through L$_3$: 1.48f

Half angle of view w=23.3°, where R is a radius of curvature, D a distance between the surfaces, N an index of refraction, and ν Abbe number.

The symbol * designates the aspherical surface and when an amount of deviation from the vertex of the lens at the position spaced from the optical axis by the semi-aperture distance Y is represented by X, the * is given by $$X = \frac{\frac{Y^2}{R}}{1 + \sqrt{1 - (1+K)\left(\frac{Y}{R}\right)^2}} +$$

$$AD \cdot Y^4 + AE \cdot Y^6 + AF \cdot Y^8 + AG \cdot Y^{10},$$

where AD, AE, AF and AG are the aspherical coefficients and K, the conic constant.

Aspherical coefficients and conic constant are as follows:

|  | *1 | *2 | *3 | *4 |
|---|---|---|---|---|
| AD: | −1.6326 × 10$^{-7}$ | −5.4613 × 10$^{-8}$ | −3.7667 × 10$^{-7}$ | −1.1130 × 10$^{-7}$ |
| AE: | −1.3586 × 10$^{-11}$ | 1.4308 × 10$^{-11}$ | 2.2573 × 10$^{-10}$ | −4.0357 × 10$^{-11}$ |
| AF: | −7.7066 × 10$^{-15}$ | −5.8274 × 10$^{-15}$ | 8.3169 × 10$^{-14}$ | 2.3370 × 10$^{-14}$ |
| AG: | 1.3647 × 10$^{-18}$ | 9.3074 × 10$^{-19}$ | 1.7814 × 10$^{-17}$ | −3.4620 × 10$^{-19}$ |
| K: | 0 | 0 | 0 | 0 |

(Embodiment 3)

|  | R | D | N | ν |
|---|---|---|---|---|
| L$_1$ | 98.310*1 | 19.85 | 1.491 | 57.2 |
|  | 21997.600*2 | 83.08 |  |  |
| L$_2$ | 113.758 | 14.39 | 1.589 | 61.0 |
|  | −245.108 | 48.41 |  |  |
| L$_3$ | −55.356*3 | 3.90 | 1.491 | 57.2 |
|  | 830.755*4 |  |  |  | f=117.55 mm 1:1.07 (when a object point is infinite ∞),

Overall length of L$_1$ through L$_3$: 1.44f

Half angle of view w=23.3°, where R is a radius of curvature, D a distance between the surfaces, N an index of refraction, and ν Abbe number.

The symbol * designates the aspherical surface, and when an amount of deviation from the vertex of the lens and at the position space from the optical axis of lens by the semi-aperture distance Y is represented by X, the * is given by $$X = \frac{\frac{Y^2}{R}}{1 + \sqrt{1 - (1+K)\left(\frac{Y}{R}\right)^2}} +$$

$$AD \cdot Y^4 + AE \cdot Y^6 + AF \cdot Y^8 + AG \cdot Y^{10},$$

where AD, AE, AF and AG designate the aspherical coefficients and K, the conic constant.

Aspherical coefficients and conic constant are as follows:

|     | *1 | *2 | *3 | *4 |
|-----|-----|-----|-----|-----|
| AD: | $-1.6706 \times 10^{-7}$ | $-5.8324 \times 10^{-8}$ | $-7.4476 \times 10^{-7}$ | $-1.2650 \times 10^{-7}$ |
| AE: | $-1.4185 \times 10^{-11}$ | $1.4525 \times 10^{-11}$ | $3.3530 \times 10^{-10}$ | $-3.9947 \times 10^{-11}$ |
| AF: | $-8.1843 \times 10^{-15}$ | $-5.7270 \times 10^{-15}$ | $1.0335 \times 10^{-13}$ | $2.3473 \times 10^{-14}$ |
| AG: | $1.3520 \times 10^{-18}$ | $8.1474 \times 10^{-19}$ | $1.5508 \times 10^{-17}$ | $-1.1189 \times 10^{-18}$ |
| K:  | $-2.5983 \times 10^{-2}$ | $1.7931 \times 10^3$ | $2.1057 \times 10^{-2}$ | $-5.3698 \times 10$ |

(Embodiment 4)

|     | R | D | N | ν |
|-----|-----|-----|-----|-----|
| $L_1$ | 118.573*¹ | 16.40 | 1.491 | 57.2 |
|       | −1464.500 | 78.22 |       |      |
| $L_2$ | 131.594   | 15.77 | 1.589 | 61.0 |
|       | −189.998  | 58.88 |       |      |
| $L_3$ | −55.092*² | 4.00  | 1.491 | 57.2 |
|       | 539.375*³ |       |       |      | f=114.85 mm, 1:1.09 (when an object point is infinite)
Overall length of $L_1$ through $L_3$: 1.51f
Half angle of view w=23.3°.
where R is a radius of curvature, D a distance between the surfaces, N an index of refraction, and ν Abbe number.

The symbol * designates the aspherical surface, and when an amount of deviation from the vertex of the lens and at the position space from the optical axis by the semi-aperture distance Y is represented by X, the * is given by $$X = \frac{\frac{Y^2}{R}}{1 + \sqrt{1 - (1+K)\left(\frac{Y}{R}\right)^2}} + AD \cdot Y^4 + AE \cdot Y^6 + AF \cdot Y^8 + AG \cdot Y^{10},$$

where AD, AE, AF and AG designate the aspherical coefficients and K, the conic constant.
The aspherical coefficients and conic constant are as follows:

|     | *1 | *2 | *3 |
|-----|-----|-----|-----|
| AD: | $-1.8904 \times 10^{-7}$ | $-3.6405 \times 10^{-7}$ | 0 |
| AE: | $1.5789 \times 10^{-12}$ | $-4.3471 \times 10^{-10}$ | 0 |
| AF: | $-5.8118 \times 10^{-15}$ | $3.4239 \times 10^{-13}$ | $-7.3540 \times 10^{-14}$ |
| AG: | $2.9601 \times 10^{-19}$ | $-1.1332 \times 10^{-17}$ | $2.0291 \times 10^{-17}$ |
| K:  | 0 | 0 | 0 |

(Embodiment 5)

|     | R | D | N | ν |
|-----|-----|-----|-----|-----|
| $L_1$ | 116.822*¹ | 15.00 | 1.491 | 57.2 |
|       | −2690.000 | 79.80 |       |      |
| $L_2$ | 121.536   | 16.50 | 1.589 | 61.0 |
|       | −188.770  | 55.30 |       |      |
| $L_3$ | −54.228*² | 4.00  | 1.491 | 57.2 |
|       | 551.979*³ |       |       |      | f=115.50 mm, 1:1.09 (when a object point is infinite ∞)
Overall length of $L_1$ through $L_3$: 1.48f
Half angle of view: w=23.3°,
where R is a radius of curvature, D a distance between the surfaces, N an index of refraction, and ν Abbe number.

The symbol * designates the aspherical surface, and when an amount of deviation from the vertex of the lens and at the position spaced from the optical axis of the lens by the semi-aperture distance Y is represented by X, the * is given by $$X = \frac{\frac{Y^2}{R}}{1 + \sqrt{1 - (1+K)\left(\frac{Y}{R}\right)^2}} + AD \cdot Y^4 + AE \cdot Y^6 + AF \cdot Y^8 + AG \cdot Y^{10},$$

where AD, AE, AF and AG are the aspherical coefficients and K, the conic constant.
The aspherical coefficients and conic constant are as follows:

|     | *1 | *2 | *3 |
|-----|-----|-----|-----|
| AD: | $-1.8173 \times 10^{-7}$ | $-8.1474 \times 10^{-7}$ | 0 |
| AE: | $-1.3921 \times 10^{-12}$ | $3.4278 \times 10^{-10}$ | 0 |
| AF: | $-7.7772 \times 10^{-15}$ | $-2.2008 \times 10^{-13}$ | $-8.6139 \times 10^{-14}$ |
| AG: | $6.5049 \times 10^{-19}$ | $1.4414 \times 10^{-16}$ | $2.6743 \times 10^{-17}$ |
| K:  | 0 | 0 | 0 |

In addition, the projection distance between the screen and the projection lens system is reduced to minimize the size of the projective display apparatus for television pictures, in which it is necessary for obtaining the picture of the same dimension to use a projection lens with a still larger angle of view. The larger angle of view, however, should require the correction of aberration of the curvature of field, whereby it is very difficult to achieve the larger aperture ratio and also the larger angle of view only by use of the projection lens system of three lenses. Therefore, in the projection lens apparatus, the face plate glass of the cathode-ray tube for emitting the picture enlarged and projected by the projection lens system is used as a component and the cathode-ray tube provided with a glass face plate which is formed in a plano-convex-lens-like-shape with the convex surface having the larger curvature being the fluorescent side thereby reducing the cost of correcting the aberration of curvature of field, applied to the projection lens system, and enabling the enlargement of the aperture ratio simultaneously with the angle of view.

Now, where the projection lens apparatus of the invention satisfies the following conditions the characteristic thereof can be further improved:

$$0.15P < f/|r_f| < P,$$

where
P: Petzval sum of the projection lens system,
f: focal length of the projection lens system, and
$r_f$: radius of curvature of the fluorescent side of the glass plate of the cathode-ray tube.

Under the above conditions, when the radius of curvature of the glass face plate of the cathode-ray tube exceeds the lower limit, it is not possible to reduce the charge of the correction of aberration on the projection lens system, resulting in that both the aperture ratio and angle of view are difficult to increase. On the contrary, when it exceeds the upper limit, the correction becomes excessive.

Next, a further embodiment of the invention will be concretely shown as follows:

(Embodiment 6)

|   | R | D | N | ν |
|---|---|---|---|---|
| $L_1$ | 81.266*1 | 24.00 | 1.491 | 57.2 |
|   | 8041.5*2 | 56.21 |   |   |
| $L_2$ | 107.784 | 17.19 | 1.589 | 61.0 |
|   | −162.452 | 38.46 |   |   |
| $L_3$ | −66.324*3 | 4.00 | 1.491 | 57.2 |
|   | 192.269*4 | 7.02 |   |   |
| FP | ∞ | 11.30 | 1.507 | 57.5 |
|   | −2350.0 |   |   |   | f=96.92 mm, 1:0.89 (when an object point is infinite)
Overall length from $L_1$ to $L_3$: 1.44f, and
Half angle of view w=27.0°, where FP designates a glass face plate of the cathode-ray tube spaced by 7.02 mm from the third lens $L_3$, the glass having a plano-convex-lens-like shape having a radius of curvature of −2350.0 at the rear surface (at the fluorescent side), R the radius of curvature, D the distance between the surfaces, N the index of refraction, and ν Abbe number. The mark * represents the aspherical surface, and when X is assumed to be an amount of deviation from the vertex of the lens at the position spaced from the optical axis of lens by the semi-aperture distance Y, * is given by $$X = \frac{\frac{Y^2}{R}}{1 + \sqrt{1 - (1 + K)\left(\frac{Y}{R}\right)^2}} + AD \cdot Y^4 + AE \cdot Y^6 + AF \cdot Y^8 + AG \cdot Y^{10},$$

where AD, AE, AF and AG are the aspherical coefficients respectively and K, the conic constant.

The aspherical coefficients and the conic constant are as follows:

|   | *1 | *2 | *3 | *4 |
|---|---|---|---|---|
| AD: | $-2.76622 \times 10^{-7}$ | $9.12985 \times 10^{-8}$ | $-6.41927 \times 10^{-6}$ | $-2.36123 \times 10^{-6}$ |
| AE: | $-1.52745 \times 10^{-11}$ | $-1.04358 \times 10^{-11}$ | $3.34918 \times 10^{-9}$ | $4.83295 \times 10^{-10}$ |
| AF: | $-1.90966 \times 10^{-14}$ | $-1.53427 \times 10^{-14}$ | $-5.65787 \times 10^{-13}$ | $1.30169 \times 10^{-13}$ |
| AG: | $-1.06965 \times 10^{-19}$ | $2.94458 \times 10^{-18}$ | $1.65240 \times 10^{-17}$ | $-4.39349 \times 10^{-17}$ |
| K: | 0 | 0 | 0 | 0 |

Figures 2A, 2B, 2C:
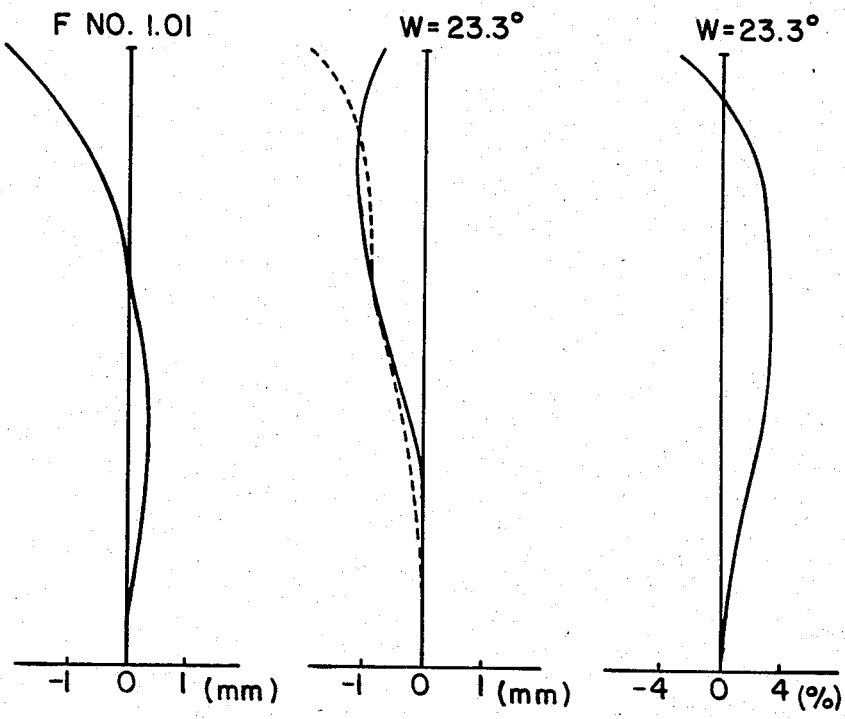
FIGS. 2a, 2b and 2c are characteristic curves of spherical aberration, astigmatism aberration and distortion aberration of the embodiment of FIG. 1.

A schematic view of the projection lens system of the projection lens apparatus according to embodiment 1 is shown in FIG. 1. The characteristics of spherical aberration, astigmatism aberration and distortion aberration according to embodiment 1 are shown in FIGS. 2a–2c.

Figures 4A, 4B, 4C:
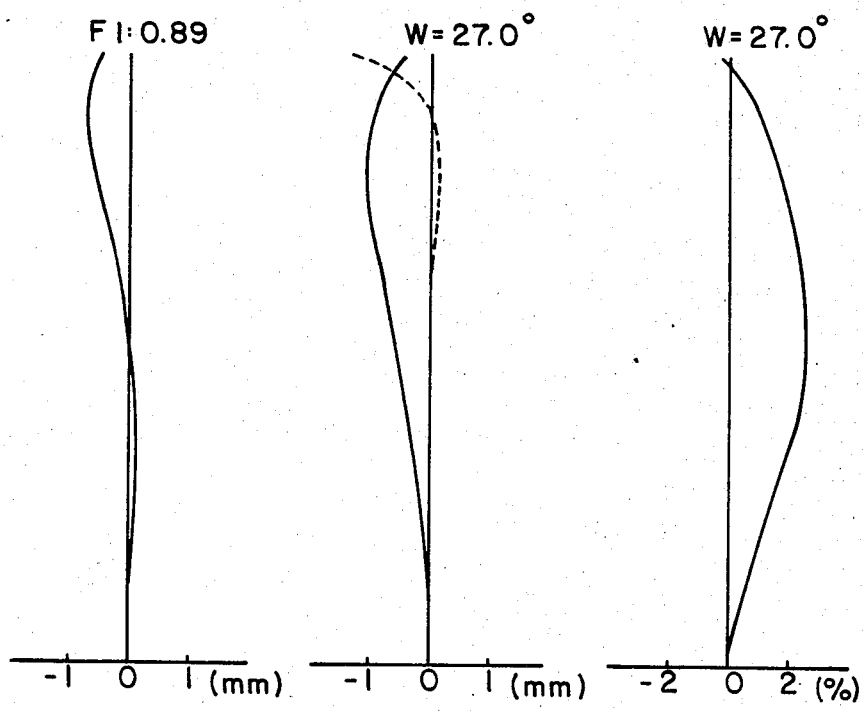
FIGS. 4a, 4b and 4c are characteristic curves of spherical aberration, astigmatism aberration and distortion aberration of the embodiment of FIG. 3.

A schematic construction view of the projection lens system of the projection lens apparatus according to embodiment 6 is shown in FIG. 3. The characteristics of spherical aberration, astigmatism aberration and distortion aberration according to embodiment 6 are shown in FIGS. 4a–4c.

From the characteristics in FIGS. 2a–2c and FIGS. 4a–4c, it is apparent that this invention properly compensates these aberrations.

Also, the embodiments 2 through 5 have characteristics almost the same as embodiment 1, so that the construction views and characteristic charts are omitted for limiting the length of the description.

As seen from the above, the present invention can achieve a larger aperture ratio while it has a large angle of view, and also has a superior in the temperature characteristic, thereby enabling the projection display of high quality and high brightness of the picture and being of great value in the industry.

What is claimed is:

1. A projection lens apparatus provided with a projection lens system which is used for a projection display apparatus for television pictures and which comprises: a first, second and third lens, said first lens being a double-convex positive lens with one convex surface of a larger curvature facing toward a screen and having at least one aspherical surface; said second lens being a double-convex positive lens and having one convex surface of a larger curvature facing toward said screen and disposed behind said first lens; and said third lens being a negative lens having one concave surface of a larger curvature facing toward said screen, and having a bi-aspherical surface and being disposed behind said second lens, said first, second and third lenses being arranged in the order from the screen side, said first lens being a plastic lens, said second lens being a glass lens, and said third lens being a plastic lens, said projection lens apparatus satisfying the following conditions:

(1) $0.4|\gamma_4| < \gamma_3 < 0.75|\gamma_4|$
(2) $0.5 < f/f_1 < 0.8$
(3) $0.8 < f/f_2 < 1.0$
(4) $-1.2 < f/f_3 < -0.9$
(5) $1.3 < f_1/f_2 < 1.8$
(6) $0.35f < d_4 < 0.55f$ and
(7) $4\gamma_1 < |\gamma_2|$ where
f: the focal length of said projection lens system,
$f_1$: the focal length of said first lens,
$f_2$: the focal length of said second lens,
$f_3$: the focal length of said third lens,
$d_4$: the distance between said second lens and said third lens,
$\gamma_1$: the radius of curvature of the surface at the screen side, i.e., the front surface, of said first lens,
$\gamma_2$: the radius of curvature of the rear surface of said first lens,
$\gamma_3$: the radius of curvature of the front surface of said second lens, and
$\gamma_4$: the radius of curvature of the rear surface of said second lens.

2. A projection lens apparatus according to claim 1, having f of 140.02 mm, an aperture ratio of f/1.01, a half view angle of 23.3° and the following dimensions:

|   | R | D | N | ν |
|---|---|---|---|---|
| $L_1$ | 147.505*1 | 22.83 | 1.491 | 57.2 |
|   | −768.890 | 103.40 |   |   |
|   | 149.949 | 23.06 | 1.589 | 61.0 |

-continued

|  | R | D | N | ν |
|---|---|---|---|---|
| $L_2$ { | −224.496 | 60.42 | | |
|  | −68.655*² | 6.90 | 1.491 | 57.2 |
| $L_3$ { | −3379.868*³ | | | | where R: a radius of curvature, D: a distance between the surfaces, N: an index of refraction, ν: Abbe number, and *: an aspherical surface, the symbol * being given by the following equation:

$$X = \frac{\frac{Y^2}{R}}{1 + \sqrt{1 - (1 + K)\left(\frac{Y}{R}\right)^2}} +$$

$$AD \cdot Y^4 + AE \cdot Y^6 + AF \cdot Y^8 + AG \cdot Y^{10},$$

where x is an amount of deviation from the vertex of the lens at a position spaced by the semi-aperture distance from the optical axis of lens, AD, AE, AF and AG are aspherical coefficients and K is a conic constant, the aspherical coefficients and the conic constant being as follows:

|  | *1 | *2 | *3 |
|---|---|---|---|
| AD: | −1.1823 × 10⁻⁷ | −1.6693 × 10⁻¹¹ | 1.8603 × 10⁻⁶ |
| AE: | 9.1990 × 10⁻¹² | 2.8769 × 10⁻¹⁴ | −1.0821 × 10⁻⁹ |
| AF: | −3.3846 × 10⁻¹⁵ | 4.6312 × 10⁻¹⁸ | 2.6821 × 10⁻¹³ |
| AG: | 2.6734 × 10⁻¹⁹ | 4.0000 × 10⁻¹⁸ | −2.6000 × 10⁻¹⁷ |
| K: | 1.5934 × 10⁻¹ | −6.3300 × 10⁻⁵ | 2.4520 × 10³ |

3. A projection lens apparatus according to claim 1, having f of 116.89 mm, aperture ratio f/1.07, a half view angle of 23.3° and the following dimensions:

|  | R | D | N | ν |
|---|---|---|---|---|
| $L_1$ { | 97.656*¹ | 19.39 | 1.491 | 57.2 |
|  | −4804.913*² | 86.02 | | |
| $L_2$ { | 115.067 | 14.39 | 1.589 | 61.0 |
|  | −273.293 | 49.15 | | |
| $L_3$ { | −55.849*³ | 4.00 | 1.491 | 57.2 |
|  | 507.712*⁴ | | | |

Where R: a radius of curvature, D: a distance between the surfaces, N: an index of refraction, and ν: Abbe number, the symbol * designating an aspherical surface given by $$X = \frac{\frac{Y^2}{R}}{1 + \sqrt{1 - (1 + K)\left(\frac{Y}{R}\right)^2}} +$$

$$AD \cdot Y^4 + AE \cdot Y^6 + AF \cdot Y^8 + AG \cdot Y^{10}$$

where x is an amount of the deviation from the vertex of lens at the position spaced by the semi-aperture distance from the optical axis of lens, AD, AE, AF and AG are aspherical coefficients and K is a conic constant, the aspherical coefficients and the conic constant being as follows:

|  | *1 | *2 | *3 | *4 |
|---|---|---|---|---|
| AD: | −1.6326 × 10⁻⁷ | −5.4613 × 10⁻⁸ | −3.7667 × 10⁻⁷ | −1.1130 × 10⁻⁷ |
| AE: | −1.3586 × 10⁻¹¹ | 1.4308 × 10⁻¹¹ | 2.2573 × 10⁻¹⁰ | −4.0357 × 10⁻¹¹ |
| AF: | −7.7066 × 10⁻¹⁵ | −5.8274 × 10⁻¹⁵ | 8.3169 × 10⁻¹⁴ | 2.3370 × 10⁻¹⁴ |
| AG: | 1.3647 × 10⁻¹⁸ | 9.3074 × 10⁻¹⁹ | 1.7814 × 10⁻¹⁷ | −3.4620 × 10⁻¹⁹ |
| K: | 0 | 0 | 0 | 0 |

4. A projection lens apparatus according to claim 1, having f of 117.55 mm, aperture ratio of f/1.07 and a half view angle of 23.3° and the following dimensions:

|  | R | D | N | ν |
|---|---|---|---|---|
| $L_1$ { | 98.310*¹ | 19.85 | 1.491 | 57.2 |
|  | 21997.6*² | 83.08 | | |
| $L_2$ { | 113.758 | 14.39 | 1.589 | 61.0 |
|  | −245.108 | 48.41 | | |
| $L_3$ { | −55.356*³ | 3.90 | 1.491 | 57.2 |
|  | 830.755*⁴ | | | | where R is a radius of curvature, D a distance between the surfaces, N an index of refraction, and ν Abbe number, the symbol * designating an aspherical surface given by $$X = \frac{\frac{Y^2}{R}}{1 + \sqrt{1 - (1 + K)\left(\frac{Y}{R}\right)^2}} +$$

$$AD \cdot Y^4 + AE \cdot Y^6 + AF \cdot Y^8 + AG \cdot Y^{10},$$

where x is an amount of deviation from the vertex of the lens, at the position spaced by the semi-aperture distance Y from the optical axis, AD, AE, AF and AG are aspherical coefficients and K is a conic constant,

|  | *1 | *2 | *3 | *4 |
|---|---|---|---|---|
| AD: | −1.6706 × 10⁻⁷ | −5.8324 × 10⁻⁸ | −7.4476 × 10⁻⁷ | −1.2650 × 10⁻⁷ |
| AE: | −1.4185 × 10⁻¹¹ | 1.4525 × 10⁻¹¹ | 3.3530 × 10⁻¹⁰ | −3.9947 × 10⁻¹¹ |
| AF: | −8.1843 × 10⁻¹⁵ | −5.7270 × 10⁻¹⁵ | 1.0335 × 10⁻¹³ | 2.3473 × 10⁻¹⁴ |
| AG: | 1.3520 × 10⁻¹⁸ | 8.1474 × 10⁻¹⁹ | 1.5508 × 10⁻¹⁷ | −1.1189 × 10⁻¹⁸ |
| K: | −2.5983 × 10⁻² | 1.7931 × 10³ | 2.1057 × 10⁻² | −5.3698 × 10 |

5. A projection lens apparatus according to claim 1, having f of 114.85 mm, aperture ratio of f/1.09, and a half view angle of 23.3° and the following dimensions:

|   | R | D | N | $\nu$ |
|---|---|---|---|---|
| $L_1$ | 118.573*1 | 16.40 | 1.491 | 57.2 |
|   | −1464.500 | 78.22 |   |   |
| $L_2$ | 131.594 | 15.77 | 1.589 | 61.0 |
|   | −189.998 | 58.88 |   |   |
| $L_3$ | −55.092*2 | 4.00 | 1.491 | 57.2 |
|   | 539.375*3 |   |   |   | where R is a radius of curvature, D a distance between the surfaces, N an index of refraction, and $\nu$ Abbe number, the symbol * designating an aspherical surface given by $$X = \frac{\frac{Y^2}{R}}{1 + \sqrt{1 - (1+K)\left(\frac{R}{R}\right)^2}} +$$

$$AD \cdot Y^4 + AE \cdot Y^6 + AF \cdot Y^8 + AG \cdot Y^{10}$$

where x is an amount of deviation from the vertex of the lens opening and at position spaced by the semi-aperture distance from the optical axis, AD, AE, AF and AG are aspherical coefficients respectively and K is a conic constant, the aspherical coefficients and the conic constant being as follows:

|   | *1 | *2 | *3 |
|---|---|---|---|
| AD: | $-1.8904 \times 10^{-7}$ | $-3.6405 \times 10^{-7}$ | 0 |
| AE: | $1.5789 \times 10^{-12}$ | $-4.3471 \times 10^{-10}$ | 0 |
| AF: | $-5.8118 \times 10^{-15}$ | $3.4239 \times 10^{-13}$ | $-7.3540 \times 10^{-14}$ |
| AG: | $2.9601 \times 10^{-19}$ | $-1.1332 \times 10^{-17}$ | $2.0291 \times 10^{-17}$ |
| K: | 0 | 0 | 0 |

6. A projection lens apparatus according to claim 1, having f of 115.50 mm, an aperture ratio of f/1.09, and a half view angle of 23.3°, and the following dimensions:

|   | R | D | N | $\nu$ |
|---|---|---|---|---|
| $L_1$ | 116.822*1 | 15.00 | 1.491 | 57.2 |
|   | −2690.000 | 79.80 |   |   |
| $L_2$ | 121.536 | 16.50 | 1.589 | 61.0 |
|   | −188.770 | 55.30 |   |   |
| $L_3$ | −54.228*2 | 4.00 | 1.491 | 57.2 |
|   | 551.979*3 |   |   |   | where R is a radius of curvature, D a distance between the surfaces, N an index of refraction, and $\nu$ Abbe number, the symbol * representing an aspherical surface given by $$X = \frac{\frac{Y^2}{R}}{1 + \sqrt{1 - (1+K)\left(\frac{Y}{R}\right)^2}} +$$

$$AD \cdot Y^4 + AE \cdot Y^6 + AF \cdot Y^8 + AG \cdot Y^{10},$$

where x is an amount of deviation from the vertex of the lens and at the position spaced by the semi-aperture distance Y opening from the optical axis, AD, AE, AF and AG are aspherical coefficients and K is a conic constant, the aspherical coefficients and the conic constant being as follows:

|   | *1 | *2 | *3 |
|---|---|---|---|
| AD: | $-1.8173 \times 10^{-7}$ | $-8.1474 \times 10^{-7}$ | 0 |
| AE: | $-1.3921 \times 10^{-12}$ | $3.4278 \times 10^{-10}$ | 0 |
| AF: | $-7.7772 \times 10^{-15}$ | $-2.2008 \times 10^{-13}$ | $-8.6139 \times 10^{-14}$ |
| AG: | $6.5049 \times 10^{-19}$ | $1.4414 \times 10^{-16}$ | $2.6743 \times 10^{-17}$ |
| K: | 0 | 0 | 0 |

7. A projection lens apparatus according to claim 1, wherein one component comprises a glass face plate of the cathode-ray tube which emits pictures to be enlarged and projected by said projection lens system, the surface of said glass face plate being shaped as a plano-convex lens having the convex surface of larger curvature being the fluorescent side.

8. A projection lens apparatus according to claim 7, which satisfies the following condition:

$$0.15P < f/|r_f| < P,$$

where
P: Petzval sum of said projection lens system,
f: focal length of the projection lens system, and
$r_f$: radius of curvature of surface of said glass face plate of said cathode-ray tube on the fluorescent side.

9. A projection lens apparatus according to claim 7, having f of 96.92 mm, an aperture ratio of f/0.89, and a half view angle of 27.0° and the following dimensions:

|   | R | D | N | $\nu$ |
|---|---|---|---|---|
| $L_1$ | 81.266*1 | 24.00 | 1.491 | 57.2 |
|   | 8041.5*2 | 56.21 |   |   |
| $L_2$ | 107.784 | 17.19 | 1.589 | 61.0 |
|   | −162.452 | 38.46 |   |   |
| $L_3$ | −66.324*3 | 4.00 | 1.491 | 57.2 |
|   | 192.269*4 | 7.02 |   |   |
| FP | ∞ | 11.30 | 1.507 | 57.5 |
|   | −2350.0 |   |   |   | where FP designates the face place glass of said cathode-ray tube spaced 7.02 mm from said third lens L3 which is plan-convex-lens-like shaped and has a radius of curvature of −2350.0 at the rear surface (at the fluorescent side), R a radius of curvature, D a distance between the surfaces, N an index of refraction, $\nu$ Abbe number, and * an aspherical surface given by $$X = \frac{\frac{Y^2}{R}}{1 + \sqrt{1 - (1+K)\left(\frac{Y}{R}\right)^2}} +$$

-continued
$$AD \cdot Y^4 + AE \cdot Y^6 + AF \cdot Y^8 + AG \cdot Y^{10}$$

where x is an amount of deviation from the vertex of the lens and at the position spaced by the semi-aperture distance Y from the optical axis, AD, AE, AF and AG are aspherical coefficients and K is a conic constant, AD, AE, AF, AG and K being as follows:

|     | *1 | *2 | *3 | *4 |
|-----|-----|-----|-----|-----|
| AD: | $-2.76622 \times 10^{-7}$ | $9.12985 \times 10^{-8}$ | $-6.41927 \times 10^{-6}$ | $-2.36123 \times 10^{-6}$ |
| AE: | $-1.52745 \times 10^{-11}$ | $-1.04358 \times 10^{-11}$ | $3.34918 \times 10^{-9}$ | $4.83295 \times 10^{-10}$ |
| AF: | $-1.90966 \times 10^{-14}$ | $-1.53427 \times 10^{-14}$ | $-5.65787 \times 10^{-13}$ | $1.30169 \times 10^{-13}$ |
| AG: | $-1.06965 \times 10^{-19}$ | $2.94458 \times 10^{-18}$ | $1.65240 \times 10^{-17}$ | $-4.39349 \times 10^{-17}$ |
| K:  | 0 | 0 | 0 | 0 |

* * * * *